Figure 1:
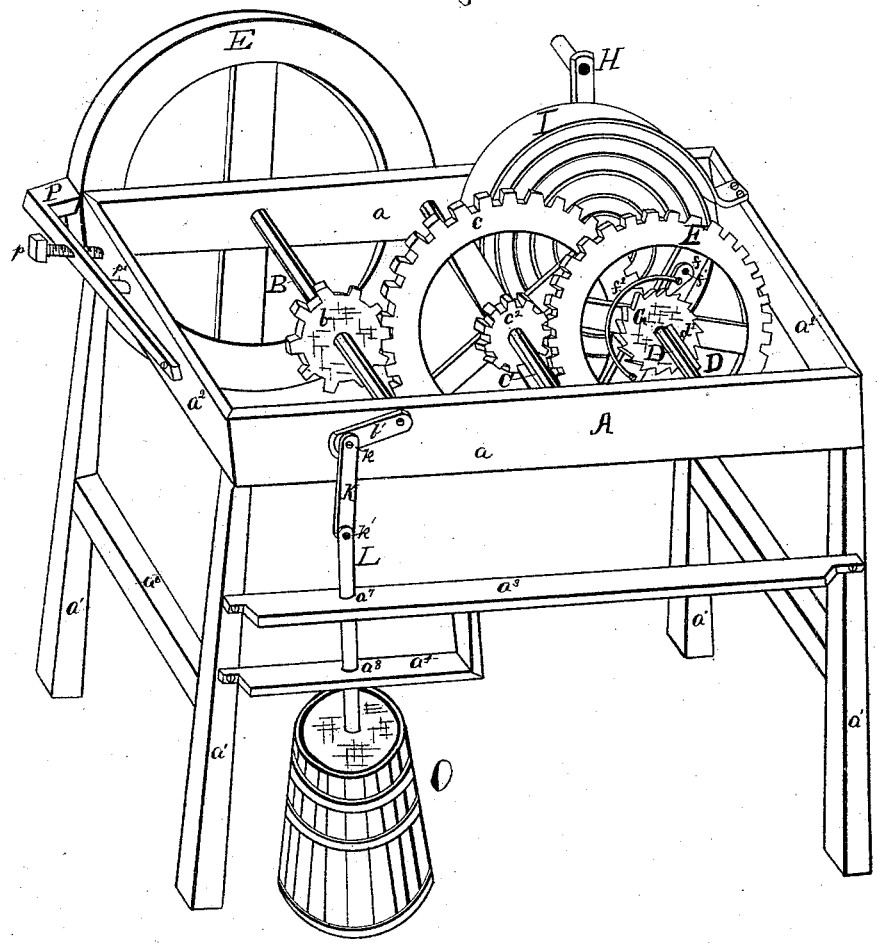

(No Model.) 2 Sheets—Sheet 1.

S. C. RANDLES.
CHURN MOTOR.

No. 341,945. Patented May 18, 1886.

Witnesses.
N. A. Haseltine.
G. A. Haseltine.

Inventor.
Spencer C. Randles
By S. A. Haseltine & Bro.
Attorneys.

(No Model.)
S. C. RANDLES.
CHURN MOTOR.
No. 341,945. Patented May 18, 1886.
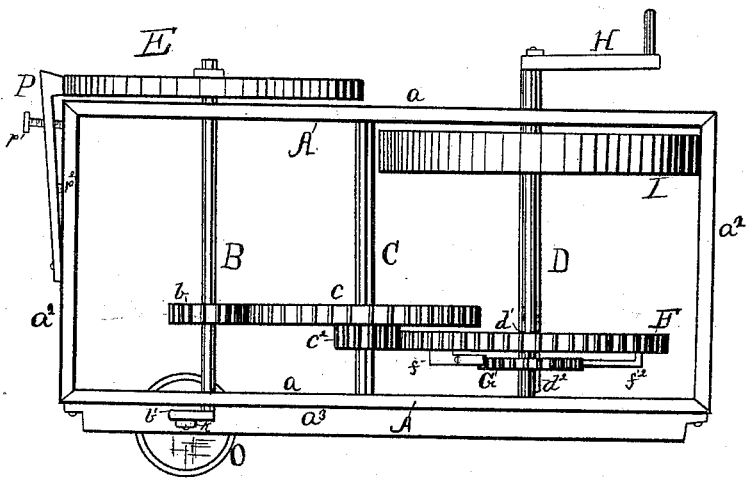
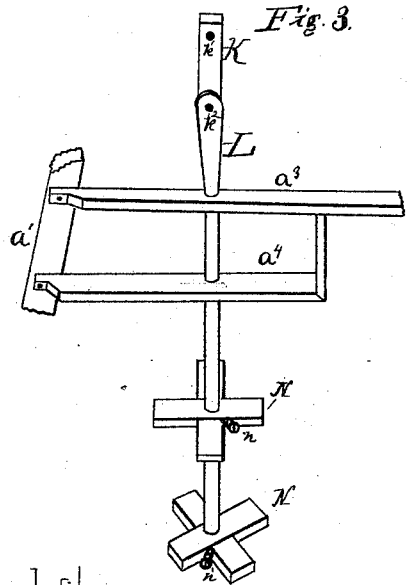
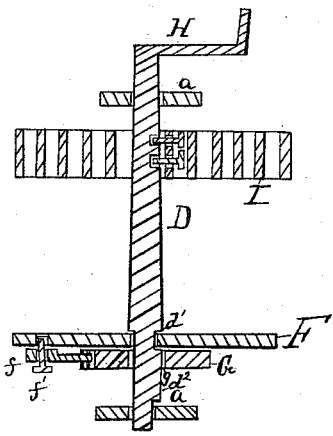
Witnesses.
N. A. Haseltine
G. A. Haseltine.
Inventor.
Spencer C. Randles
By S. A. Haseltine & Bro.
Attorneys.

United States Patent Office.

SPENCER C. RANDLES, OF BUFFALO, MISSOURI, ASSIGNOR OF ONE-HALF TO JOHN W. RANDLES AND NATHANIEL FINLEY, OF SAME PLACE.

CHURN-MOTOR.

SPECIFICATION forming part of Letters Patent No. 341,945, dated May 18, 1886.

Application filed October 20, 1885. Serial No. 180,402. (No model.)

*To all whom it may concern:*

Be it known that I, SPENCER C. RANDLES, a citizen of the United States, residing at Buffalo, in the county of Dallas and State of Missouri, have invented certain new and useful Improvements in Devices for Propelling Churns; and I do hereby declare the following to be a full, clear, and exact description of the invention, such as will enable others skilled in the art to which it appertains to make and use the same.

My invention relates to improvements in devices for propelling churns, the object of which is to provide a cheap, simple, durable, and convenient device for propelling or operating a churn. These objects I attain by means of the device illustrated in the accompanying drawings, forming a part of this specification, in which—

Figure 1 is a perspective view of the device. Fig. 2 is a plan or top view of the same. Fig. 3 is a detail view showing the dasher. Fig. 4 is a sectional view of the shaft D and attachments.

Similar letters of reference indicate corresponding parts in the several figures.

A is a frame consisting of side pieces, $a\ a$, secured by end pieces, $a^2\ a^2$, supported upon legs $a$. Cross-pieces $a^6$ may be used to strengthen the legs. Said frame also has pieces $a^3\ a^4$, said pieces $a^3\ a^4$ having holes $a^7\ a^8$ made in them for receiving and guiding the churn-dasher.

B, C, and D are shafts having suitable bearings in the side pieces, $a\ a$, of the frame.

I is a coil-spring of any desired size and length, one end of which is secured to piece $a^2$ of the frame, the other being attached to the shaft D. Said shaft has a winch, H, which is preferably made detachable, by means of which the spring is wound around the shaft. Said shaft D also has a shoulder, $d'$, against which the spring-wheel F is placed, having bearings so as to freely turn upon the shaft. It is provided with a pawl, $f$, secured by a bolt, $f'$, or other suitable means, to the side of the wheel, and a suitable spring, $f^2$, for holding the free end of the pawl toward the center against a ratchet-wheel, G. Said ratchet-wheel is secured to the axle D by any suitable means, preferably by means of a groove, $g$, in the wheel, and a rib, $d^2$, on the shaft D, so as to cause it to revolve with the shaft. Shaft C has a pinion, $c^2$, which engages the spur-wheel F, and a spur-wheel, $c$, which engages a pinion, $b$, on the shaft B. Said shaft B has a balance-wheel, $e$. Said balance-wheel is provided with a suitable brake, P. Said brake is preferably formed of spring material, one end of which is attached to the frame A, and rests over a projection, $p^2$, and is provided with a set-screw, $p$, for adjusting the tension of the brake upon the wheel E. Said shaft also has an eccentric, $b'$, which is provided with an arm, K, which is hinged to one end of the dasher-rod L. Said dasher has one or more heads, N N, which are provided with set-screws $n\ n$, or other suitable device, so as to enable them to be raised or lowered on the dasher-rod, to be used in churns of various sizes or in creams of any depth.

O is a churn-vessel of any desired size.

The device is operated thus: One of the pins, $k'$ or $k^2$, is removed, the dasher-rod removed, and the churn put in place. The heads N N are adjusted and the dasher secured in place. The crank or winch H is placed on the shaft D and the spring wound up. Meanwhile the brake P is placed upon the wheel E. The pawl $f$ prevents the shaft from turning back without turning the wheel F, and thus operating the churn-dasher above described when the brake is partly removed from the wheel E.

Having thus described my invention, what I claim as new, and desire to secure by Letters Patent, is—

1. A device for propelling churns, composed of a frame, A, having a guide, $a^3\ i^4$, shaft D, having a winch, H, coil-spring I, spur-wheel F, and ratchet-wheel G, a shaft, C, having a pinion, $c^2$, and spur-wheel $c$, a shaft, B, having a balance-wheel, E, brake P, pinion $b$, and eccentric $b^2$, arm K, and dasher L, substantially as shown and described.

2. A device for propelling a churn, comprising a shaft, D, which is provided with a shoulder, $d'$, and a rib, $d^2$, and has a coil-spring, I, spur-wheel F, provided with a pawl, $f$, and spring $f^2$, and a ratchet-wheel, G, having a groove, $g$, substantially as shown and described.

3. The combination, with a frame, A, provided with a guide, $a^3 a^4$, of shafts B C D, having cog-wheels $a$, winch H, ratchet-wheel, balance-wheel, brake, eccentric, and an arm, K, and churn-dasher L, substantially as shown and described.

4. The combination of a shaft, D, having a coil-spring, I, ratchet-wheel G, spur-wheel F, provided with a pawl, shaft C, having a pinion, $c^2$, and spur-wheel $c$, shaft B, having a balance-wheel, E, brake P, pinion $b$, and eccentric $b'$, arm K, and dasher L, substantially as and for the purpose set forth.

In testimony whereof I affix my signature in presence of two witnesses.

SPENCER C. RANDLES.

Witnesses:
 S. A. HASELTINE,
 JOHN W. RANDLES.